J. F. P. McMULLEN.
COOKING CABINET.
APPLICATION FILED FEB. 20, 1915.
1,143,420.
Patented June 15, 1915.
3 SHEETS—SHEET 2.
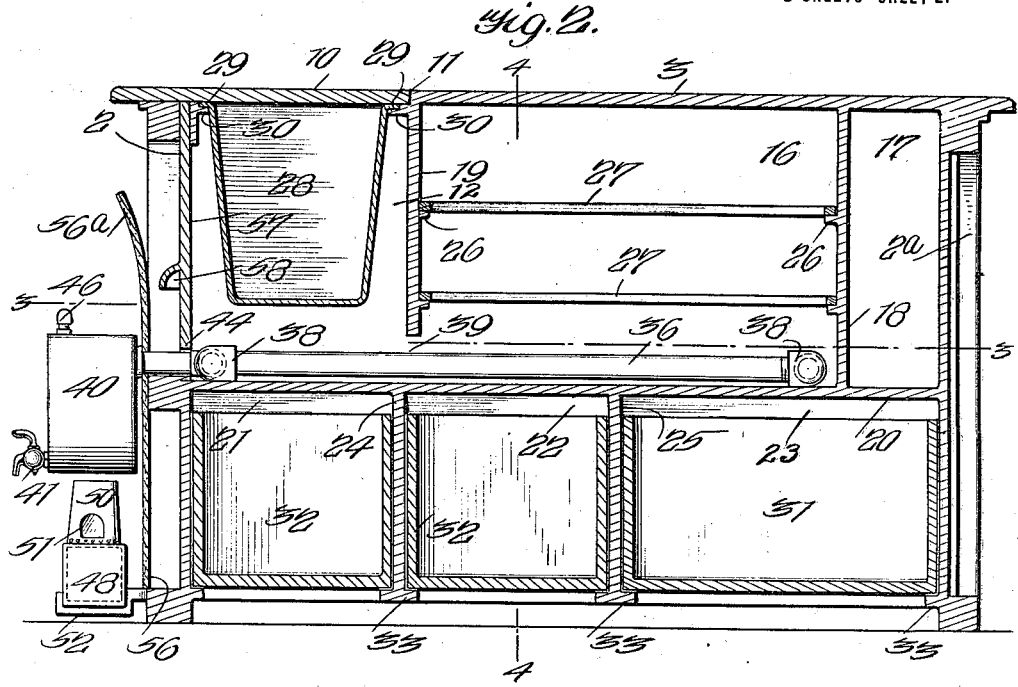
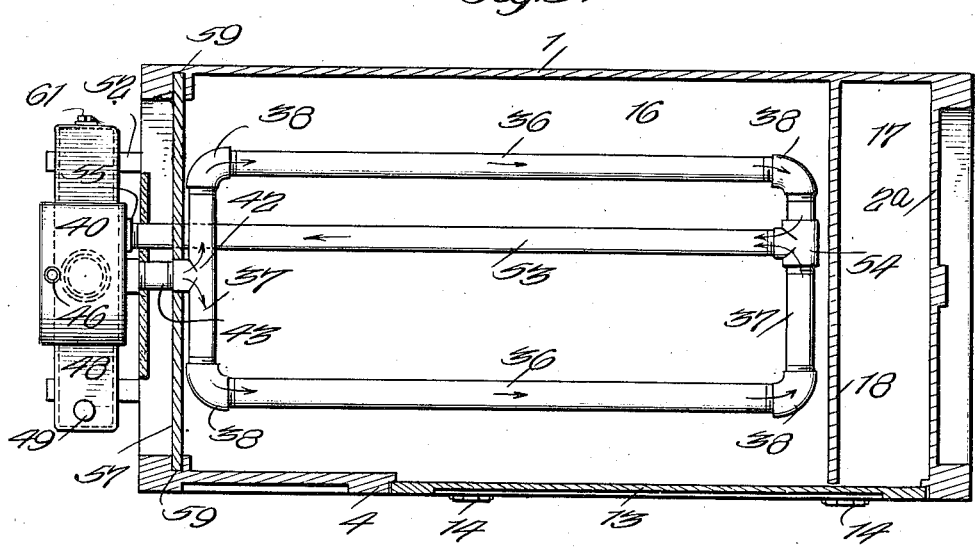
WITNESSES:
INVENTOR
JOHN F. P. McMULLEN,
BY Munn & Co.
ATTORNEYS

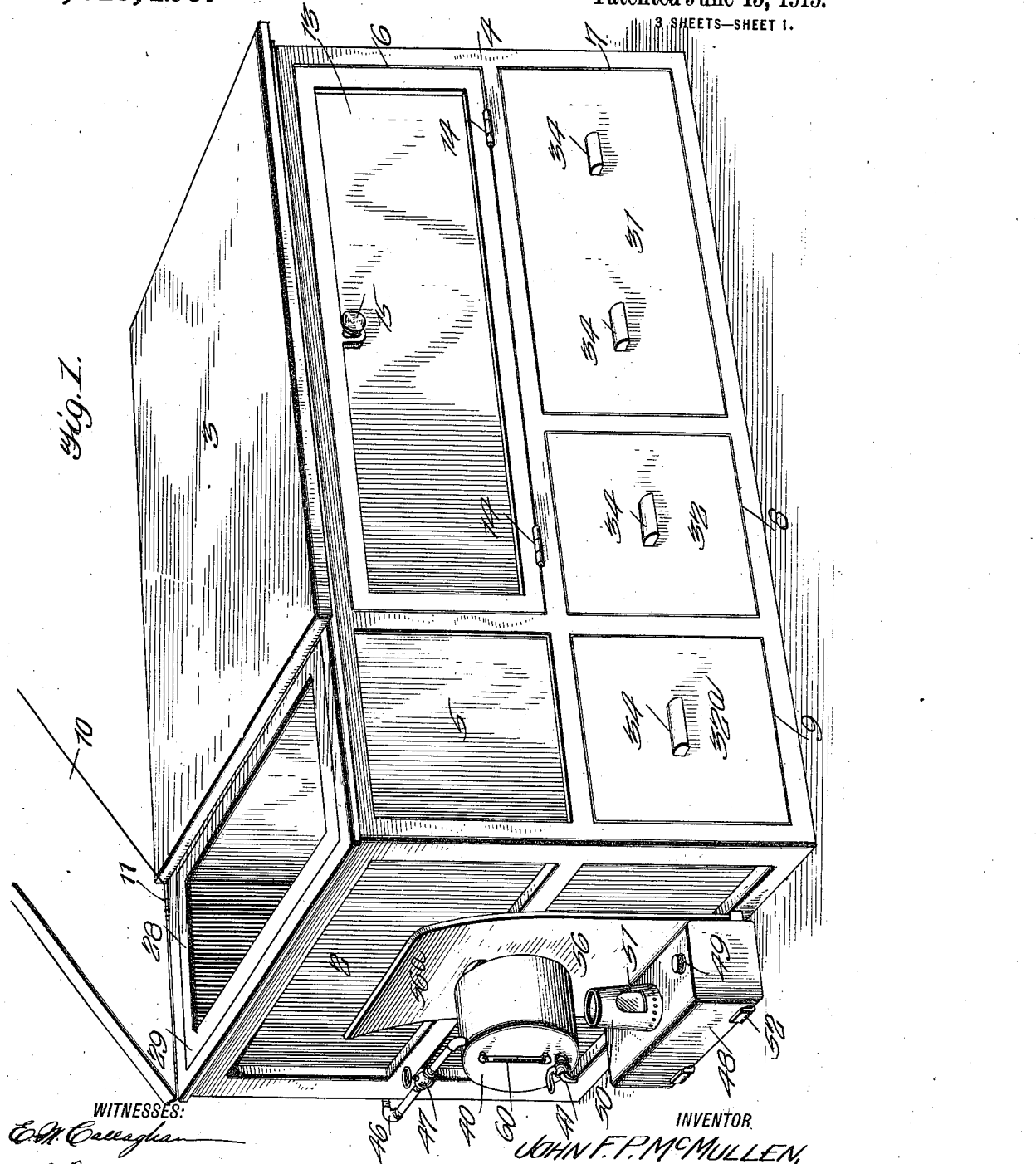

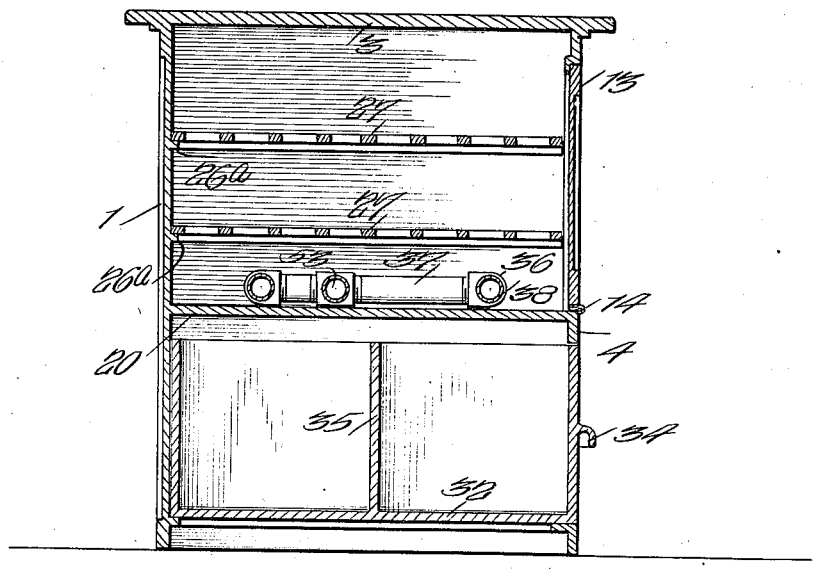
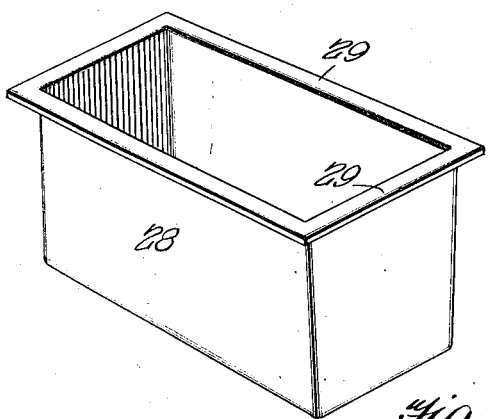
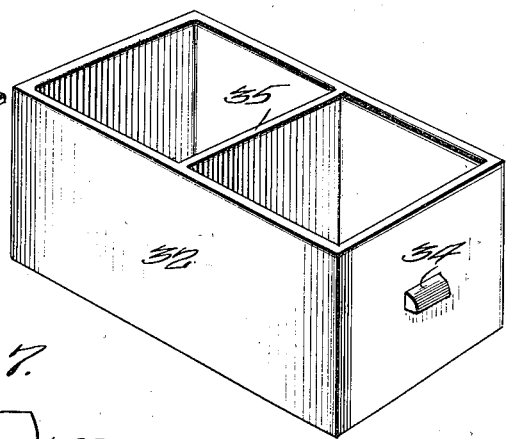
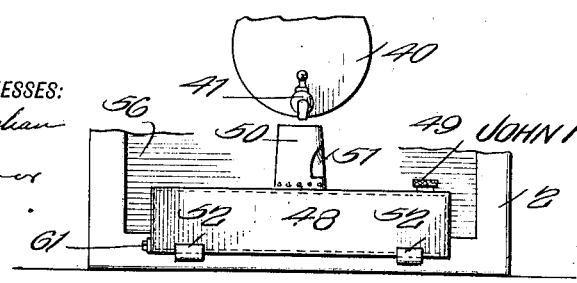

UNITED STATES PATENT OFFICE.

JOHN F. P. McMULLEN, OF WAKEFIELD, KANSAS.

COOKING-CABINET.

1,143,420.  Specification of Letters Patent.  Patented June 15, 1915.

Application filed February 20, 1915. Serial No. 9,571.

*To all whom it may concern:*

Be it known that I, JOHN F. P. MCMULLEN, a citizen of the United States, and a resident of Wakefield, in the county of Clay and State of Kansas, have invented a new and useful Improvement in Cooking-Cabinets, of which the following is a specification.

My invention is an improvement in cooking cabinets, and has for its object to provide a cabinet of the character specified, adapted for simultaneously cooking a number of individual dishes or articles, wherein the heating is brought about by the circulation of hot water, the water being heated by a liquid fuel burner.

In the drawings:—Figure 1 is a perspective view of the improved cabinet, Fig. 2 is a longitudinal vertical section, Figs. 3 and 4 are sections on the lines 3—3 and 4—4, respectively, of Fig. 2, Fig. 5 is a perspective view of the kneading trough or pan. Fig. 6 is a perspective view of one of the bread raising drawers, and Fig. 7 is a partial front view of the boiler and burner.

The present embodiment of the invention comprises a casing or cabinet, consisting of a paneled rear wall 1, paneled end walls 2 and 2ª, a top 3, and a front wall 4, the said front wall having one panel indicated at 5 and a series of openings indicated at 6, 7, 8 and 9. The cover 3 extends from one end of the cabinet to near the other, leaving a space which is normally closed by a door 10, the door being hinged as indicated at 11 to the cover in any suitable manner to close down in the plane of the cover or to be swung upward into the position shown in Fig. 1 to permit access to the compartment 12 just below the door.

The opening 6 in the front wall 4 is normally closed by a door 13, the said door being hinged to the bottom of the opening 6, as indicated at 14 to open downward and outward, and the door may be held closed by means of a latch 15. The door 13 is a drop door, and the said door is adapted to close a plurality of compartments 16 and 17, respectively, the compartment 17 being at the opposite end wall from the compartment 12, while the compartment 16 is between the compartments 12 and 17.

The compartment 16 is divided from the compartment 17 by a vertical partition 18, while the compartment 12 is divided from the compartment 16 by a vertical partition 19. These partitions 18 and 19 extend the full width of the casing, that is, from the rear wall 1 to the front wall 4, and the compartments 17 extend from the top or cover 3 of the cabinet to a position below the center of the cabinet, where the said partition meets a horizontal partition 20, the partition 20 dividing the cabinet into upper and lower portions.

The upper portion is further sub-divided as before stated by the partitions 18 and 19, and the lower compartment is sub-divided into three compartments 21, 22 and 23, by means of vertical partitions 24 and 25, the said partitions 20, 24 and 25 extending to the full width of the cabinet. The adjacent faces of the partition walls 18 and 19 are provided with horizontal ribs 26, the ribs of each partition being spaced apart vertically, and registering with the ribs of the other partition, and the ribs act as guides and supports for horizontal shelves 27 arranged within the compartment 16.

The pan 28 shown in Fig. 5 is arranged within the compartment 12, the said pan being of suitable depth as shown, and having at its upper edge a marginal outwardly extending flange 29, the said flange extending entirely around the upper edge of the pan. The pan is of greatest width at its top, that is, at the flange 29 and gradually decreases in width from above downward in such manner that the lower end is of slightly less width than the upper end.

The flanges 29 at the side edges of the pan engage rabbeted supports 30 at the top of the compartment 12 and at the opposite sides and opposite ends thereof, to support the pan with the upper surface of the flange 29 just below the door 10 when the said door is closed.

When the door 10 is closed as shown in Fig. 2, the door will rest upon the upper faces of the flanges 29 and the pan is of smaller dimensions than the compartment 12, so that it is out of contact with the inner surface of the compartment to provide a space between the pan and the compartment on all sides of the pan, as well as below the same.

A drawer 31 is arranged within the compartment 25 and other drawers 32 and 32ª are arranged within the compartments 21 and 22. The bottom of the cabinet is open as shown in Figs. 2 and 4, and guiding and supporting ribs 33 are provided extending transversely of the cabinet at each end and at each partition 24 and 25 for engagement by the bottom of the drawers to support the drawers and to guide them in their movement into and out of the compartments. Each drawer has one or more handles 34 at its front for permitting the withdrawal and insertion of the drawers, and the drawer 32 has a vertical partition 35, arranged transversely at the center thereof and dividing the drawer into two compartments as shown.

The partition 19 does not extend into contact with the horizontal partition 20, the lower edge of the said partition 19 being spaced above the upper face of the partition 20 as shown in Fig. 2 to permit the passage of the heating mechanism. This mechanism comprises a substantially rectangular frame composed of piping and consisting of side members 36 and end members 37, the side members and end members being connected at their adjacent ends by elbows 38. The heating frame rests upon the upper face of the horizontal partition 20, and one of the end members is arranged adjacent to the partition 18, while the other end member is arranged adjacent to the end wall 2, and the side members extend through the passage 39 between the lower side edge of the partition 19 and the upper face of the partition 20.

A boiler 40 of cylindrical form is arranged outside of the end wall 2, the said boiler having a discharge valve 41, at its lower side and being connected at its upper side, to a lateral branch 42 on the adjacent end member 37 of the heating frame, by means of a short section of pipe 43. This pipe 43 passes through an opening 44 in the wall 2, engaging at one end the lateral branch 42 of the adjacent end member of the heating frame and engaging at the other end a nipple 45 at the top of the boiler. The boiler is supplied by a supply pipe 46, leading from a suitable source of supply to the boiler and opening in the top of the boiler, and a controlling valve 47 is interposed in the pipe for permitting the flow of the water to be controlled. The boiler is supported in any suitable manner as for instance, by the pipe 43, and an oil burner is arranged below the boiler. The said burner comprises a tank 48, having a filling opening normally closed by a cover 49, and a burner which is encircled by a tubular shield or guard 50, the said shield or guard having windows 51, covered by a transparent material, as for instance, mica, or the like.

The burner is supported by bracket arms 52, extending outwardly from the lower end of the wall 2, and the upper faces of the bracket arms are recessed transversely to receive the tank 48, as shown in Figs. 1 and 2.

The pipe 43 leads the heated water away from the boiler, and the cooled water is returned to the boiler, by means of a pipe 53, the said pipe being connected with the lateral branch of a T 54, which is interposed in the end member 37 of the heating frame adjacent to the partition wall 18.

The opposite end of the pipe 53 passes beneath the end member 37 of the heating frame adjacent to the boiler, and passes through the end wall 2, engaging a nipple 55 in the boiler, but at a lower level than the nipple 43. Thus as the water is heated in the boiler by the burner it passes out of the boiler by way of the pipe 43, dividing on its entrance to the end member 37 of the heating frame and passing in both directions through the side members 36 of the heating frame to the end member 37 of the frame adjacent to the partition 18. Here the water leaves the heating frame by way of the T 54, and by way of the pipe 53 the water is returned to the boiler for reheating.

A shield in the form of a plate 56 is arranged between the burner, the boiler and the cabinet, the said plate extending from the bracket arms 52 to a point well above the boiler, and the upper end of the plate is curved outwardly as shown at 56$^a$ away from the wall 2.

A door 57 is provided in the wall 2 at the compartment 12, and above the horizontal position 20, and the said door has a handle 58 on its outer face for convenience in manipulating the same. The door engages vertical grooves or guideways 59 in the front and rear walls of the cabinet, and the upper edge of the door extends between the front wall 2 and the adjacent guide 30 for the pan 28 in such manner that when the door 10 is open, the door 57 may be lifted by means of the handle 58 to permit access to that portion of the heating frame within the compartment 12. The door permits access to that portion of the heating frame within the compartment 16.

In operation, the pan 28 is a kneading pan for kneading dough, bread or the like, and the compartment 16 is intended to hold the bread, after it has been kneaded, molded and placed in the baking pan, during the raising of the bread. The pans are placed on the shelves 27, and the said shelves are of grated construction, as shown more particularly in Fig. 4.

It will be noticed that in addition to the ribs 26 the rear wall 1 is also provided with ribs 26$^a$, for engagement by the shelves. Each shelf is in the form of a rectangular frame, having bars arranged longitudinally of the frame. The heating system is constituted by the heater or burner, the boiler, the frame 36—37 and the pipe 53. Both the boiler and the tank are rigidly connected with the cabinet and instead of the pipe 46 the boiler may be filled by hand. That is, a normally closed aperture may be provided at the top of the boiler.

It will be noted that a glass water gage indicated at 60 is arranged on the front of the boiler, in order that the height of the water in the boiler may be seen at a glance. The opening or window indicated at 51 is for the purpose of permitting the flame of the burner to be seen. It is obvious that the heater 48—49—50—51 which is designed to utilize kerosene, may be replaced by a gas heater. The heater has a nipple at one end normally closed by a threaded plug 61, for permitting the tank to be drained.

The shield 56ª is of asbestos or other non-heat conducting material, and the said sheet protects the cabinet from injury by the heat from the boiler. It will be noticed that this shield has openings for the pipes 43 and 53. The drawer 31 may be used, if desired, for holding bread flour, and in practice this drawer will have a capacity of fifty pounds. The drawer 32ª is designed to hold pastry flour, and this drawer has a capacity of twenty-five pounds. The drawer 32 is designed for holding sugar and salt, one compartment receiving the sugar and the other the salt, and each compartment has a capacity of twelve and one-half pounds.

The compartment 17 is designed to hold pans for bread, cakes, cookies or the like, rolling pin and any other utensils that may be used in connection with the cabinet. The improved cabinet is preferably composed of suitable wood, paneled and having a suitable finish, and the cabinet should be steam, water and dust proof. A preferred size is thirty-two inches in height, forty-eight inches in length at the top, that is, at the cover 3, and twenty-seven inches in width. The top 3 of the cabinet is preferably covered with aluminum or other metal to form a surface that may be used as a bread board or for a like purpose. The pan 28 is of metal and this pan is removable for permitting it to be cleaned. The shelving compartment has a capacity of twelve two-pound loaves, or for two large flat pans used for baking coffee cakes or rolls. It is obvious that the cabinet might be of any desired dimensions.

It will be understood that the cabinet is not in fact a cooking cabinet, but is merely designed to prepare certain characters of food products for cooking. The cabinet is more especially designed to raise bread, and to keep bread or coffee cake sponge warm during the raising. The baking is done in a range or like mechanism. It will be noticed that the door 10 is hinged at the rear of the cabinet so that when lifted it offers no impediment to the transfer of the dough from the pan 28 to the top of the cabinet. On the top of the cabinet the dough is divided and hand molded into the desired size of loaves or rolls, and is then placed in the baking pans. The heating tank 48 may be lifted from the bracket 52 when it is desired for any purpose, and the boiler is also removable. When the door 57 is lifted, the entire heating plant may be withdrawn from the cabinet.

I claim:—

1. A cabinet of the character specified, comprising a casing having paneled ends and a paneled rear wall, said cabinet being divided into upper and lower sections by a transverse horizontal partition, and the upper section being divided by vertical partitions into front and rear compartments and a central compartment, the lower section being divided by vertical partitions into three compartments for receiving drawers, drawers slidable in the said last-named compartments, the front side wall of the cabinet having openings for the drawers and having a drop door in front of the central and rear compartments of the upper section, said casing having a fixed top over the central and rear compartments, and a hinged cover over the front compartment, said cabinet having an opening in the end wall at the front compartment and a vertically slidable door normally closing the said compartment, a kneading pan of metal having a marginal flange at its top within the said compartment, the cabinet having rabbeted guides for receiving the flanges to hold the pan separated from the walls of the compartment, horizontal guide ribs on the vertical partitions in the central compartment and registering at the opposite ends of the compartments, shelves seated on the ribs and movable into and out of the cabinet, and means on the upper face of the horizontal partition and within the front and central compartments for heating permitting the circulation of a heating fluid to heat the cabinet, said means comprising a tubular substantially rectangular frame comprising connected side and end members, and pipes connected with the respective end members and extending through the end of the cabinet at the front compartment, a boiler connected with the said pipes, and an oil heater for heating the boiler arranged below the boiler, said heater and boiler being connected to the cabinet, and a shield of non-heat conducting material connected to the cabinet, between the cabinet, the boiler, and the heater.

2. A cabinet of the character specified, comprising a casing having paneled ends and a paneled rear wall, said cabinet being divided into upper and lower sections by a transverse horizontal partition, and the upper section being divided by vertical partitions into front and rear compartments and a central compartment, the lower section being divided by vertical partitions into three compartments for receiving drawers, drawers slidable in the said last-named compartments, the front side wall of the cabinet having openings for the drawers and having a drop door in front of the central and rear compartments of the upper section, said casing having a fixed top over the central and rear compartments, and a hinged cover over the front compartment, said cabinet having an opening in the end wall at the front compartment and a vertically slidable door normally closing the said compartment, a kneading pan of metal having a marginal flange at its top within the said compartment, the cabinet having rabbeted guides for receiving the flanges to hold the pan separated from the walls of the compartment, horizontal guide ribs on the vertical partitions in the central compartment and registering at the opposite ends of the compartments, grated shelves seated on the ribs and movable into and out of the cabinet, and means on the upper face of the horizontal partition and within the front and central compartments for permitting the circulation of a heating fluid to heat the cabinet.

3. A cabinet of the character specified, comprising a casing having paneled ends and a paneled rear wall, said cabinet being divided into upper and lower sections by a transverse horizontal partition, and the upper section being divided by vertical partitions into front and rear compartments and a central compartment, the lower section being divided by vertical partitions into three compartments for receiving drawers, drawers slidable in the said last-named compartments, the front side wall of the cabinet having openings for the drawers and having a drop door in front of the central and rear compartments of the upper section, said casing having a fixed top over the central and rear compartments, and a hinged cover over the front compartment, a kneading pan of metal having a marginal flange at its top within the said compartment, the cabinet having rabbeted guides for receiving the flanges to hold the pan separated from the walls of the compartment, horizontal guide ribs on the vertical partitions in the central compartment and registering at the opposite ends of the compartments, grated shelves seated on the ribs and movable into and out of the cabinet, and means on the upper face of the horizontal partition and within the front and central compartments for permitting the circulation of a heating fluid to heat the cabinet.

4. A kitchen baking cabinet, comprising a casing having a rear wall and end walls, a horizontal partition dividing the cabinet into upper and lower sections, vertical partitions dividing the upper section into a front, a rear, and a central compartment, and dividing the lower section into drawer compartments, drawers in the said last-named compartments, the cabinet having a front wall provided with openings for the drawers, and having a hinged drop door at the central and rear compartments, said cabinet having a fixed cover over the central and rear compartments and a hinged cover over the front compartment, a kneading pan supported in the front compartment and out of contact with the walls thereof, shelving supported in the central compartment, and removable therefrom, and a heating system arranged on the horizontal partition in the central and front compartments, said system comprising a substantially rectangular tubular frame consisting of connected side and end members and connecting pipes extending from the end members from the end wall adjacent to the front compartment, a boiler connected with the said connecting pipes, and means supported by the cabinet for heating the boiler.

5. A kitchen baking cabinet, comprising a casing having a rear wall and end walls, a horizontal partition dividing the cabinet into upper and lower sections, vertical partitions dividing the upper section into a front, a rear and a central compartment, and dividing the lower section into drawer compartments, drawers in the said last-named compartments, the cabinet having a front wall provided with openings for the drawers, and having a hinged drop door at the central and rear compartments, said cabinet having a fixed cover over the central and rear compartments and a hinged cover over the front compartment, a kneading pan supported in the front compartment and out of contact with the walls thereof, shelving supported in the central compartment, and removable therefrom, and a heating system arranged on the horizontal partition in the central and front compartments.

JOHN F. P. McMULLEN.

Witnesses:
F. R. WEST,
W. H. MYERS.